Aug. 31, 1948.   R. D. PIKE   2,448,191
SEPARATION OF CHLORIDES FROM POTASSIUM CARBONATE
Filed March 22, 1944   2 Sheets-Sheet 1

WITNESSES.

INVENTOR.
ROBERT D. PIKE.
BY
his ATTORNEYS.

Patented Aug. 31, 1948

2,448,191

UNITED STATES PATENT OFFICE 2,448,191

SEPARATION OF CHLORIDES FROM POTASSIUM CARBONATE

Robert D. Pike, Pittsburgh, Pa.

Application March 22, 1944, Serial No. 527,607

7 Claims. (Cl. 23—63)

This invention relates to the removal of chlorides from brines containing sodium and potassium carbonates, and particularly to the separation of chlorides from potassium carbonate produced by the invention of my Patents Nos. 2,343,080 and 2,343,081, both granted February 29, 1944.

Figure 1:
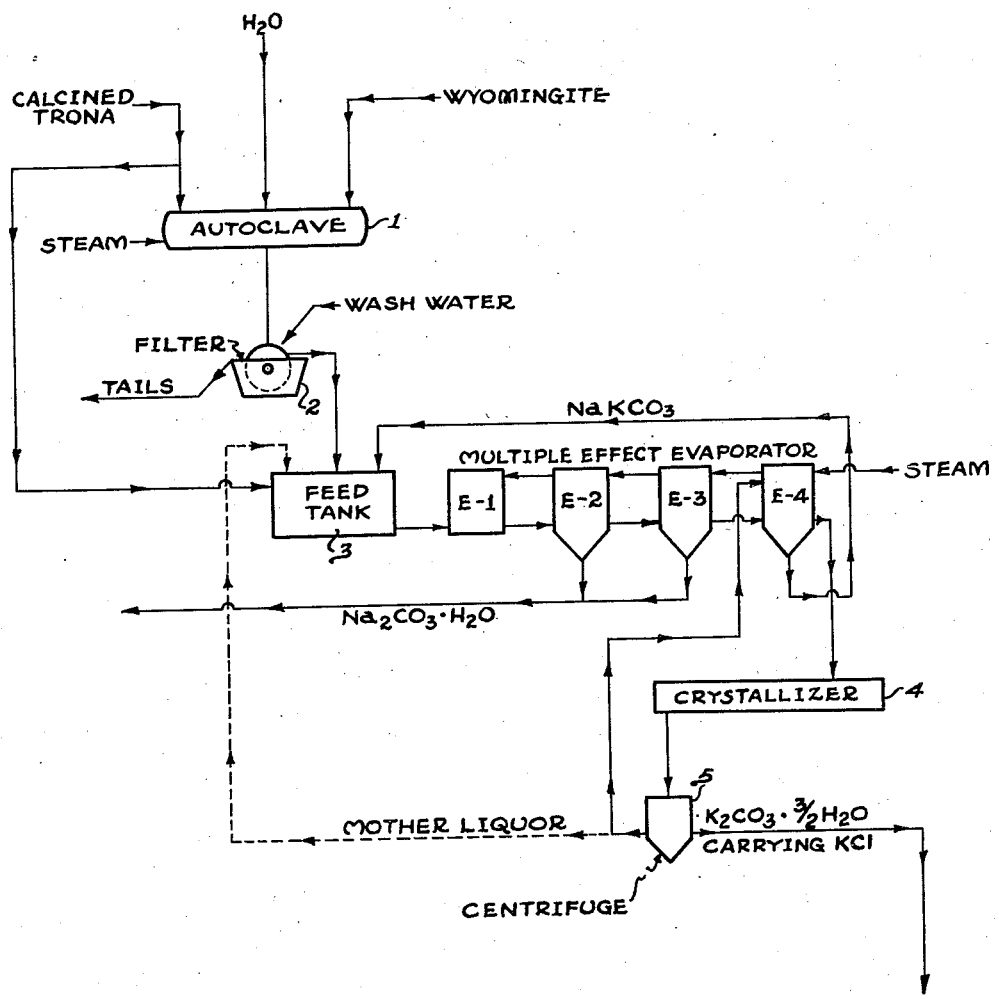

The invention will be described with reference to the accompanying drawings in which Fig. 1 is a simplified flow sheet of essential details of the process of my aforesaid patent; and Fig. 2 a flow sheet illustrative of the preferred embodiment of the present invention as applied thereto.

In the State of Wyoming there are extensive deposits of a rock called "wyomingite," a typical analysis of which is as follows:

| | Per cent |
|---|---|
| $K_2O$ | 11.48 |
| $Na_2O$ | 1.32 |
| $SiO_2$ | 51.70 |
| $Al_2O_3$ | 13.05 |
| $Fe_2O_3$ | 4.20 |
| FeO | 1.28 |
| CaO | 6.80 |
| MgO | 7.60 |
| $P_2O_5$ | 2.75 |
| | 100.18 |

Approximately one-half of wyomingite consists of the mineral leucite ($K_2O.Al_2O_3.4SiO_2$), which is potassium silicate mineral that is amenable to base exchange between its potassium content and sodium ion. Due to this property about 8 pounds of $K_2O$ per 100 pounds of wyomingite are available for base exchange with sodium.

The principal deposit of wyomingite is in Zirkel Mesa, near Superior, Wyoming, about 40 miles easterly from the town of Green River. About 20 miles westerly from Green River are large beds of almost pure trona $$(Na_2CO_3.NaHCO_3.2H_2O)$$

a typical analysis of which is as follows:

| | Per cent |
|---|---|
| $Na_2CO_3$ | 49.29 |
| $NaHCO_3$ | 33.18 |
| $H_2O$ | 17.07 |
| Water insoluble | 0.30 |
| Cl | 0.03 |
| $SO_3$ | Trace |

The process of my aforesaid patents involves reacting wyomingite, or similar rock, with calcined trona or the like to effect base exchange of the potassium of the wyomingite and produce potassium carbonate which dissolves, as it is formed, in the sodium carbonate liquor provided by the trona, and treatment of the resultant brine by appropriate means to recover therefrom the two carbonates separately. In the practice of that invention trona may be heated to decompose the sodium bicarbonate present in the rock, and the wyomingite may then be treated separately with a solution of the resultant sodium carbonate. I may effect the decomposition in a suitable reaction vessel which is initially charged with raw trona, wyomingite and water so that the wyomingite base exchange reaction then follows without interruption. For optimum efficiency a considerable excess of sodium carbonate is present because this assists in recovering the maximum amount of the available potassium content of the wyomingite.

The reactions involved are as follows—

Trona decomposition:

$$2Na_2CO_3.NaHCO_3 \rightarrow 3Na_2CO_3.H_2O + CO_2$$

Base exchange:

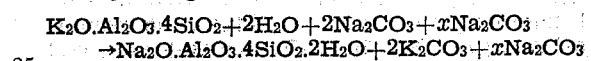

$$K_2O.Al_2O_3.4SiO_2 + 2H_2O + 2Na_2CO_3 + xNa_2CO_3$$
$$\rightarrow Na_2O.Al_2O_3.4SiO_2.2H_2O + 2K_2CO_3 + xNa_2CO_3$$

where the term $xNa_2CO_3$ refers to the excess of this compound which is used to cause the base exchange reaction to go to completion.

Having reference to Fig. 1, wyomingite and an excess of trona are charged into an autoclave 1 together with water. Steam, e. g., at 200 pounds pressure, is applied to the autoclave and the charge is agitated. Under such conditions the base exchange reaction will usually be completed in about three hours after the charge has reached its full temperature.

After the completion of the base exchange reaction the contents of the autoclave are passed to a filter 2. The cake of insoluble residue, largely sodium leucite with other inert, insoluble material, is discarded as tailings. The clear hot brine, containing sodium and potassium carbonates and potassium chloride, together with the wash water from filter 2, is then passed to a feed tank 3 where additional calcined trona may be added, if desired, to form the evaporator feed. The brine then passes to a quadruple effect evaporator, E—1, E—2, E—3, E—4, in which the brine is concentrated to a point where sodium carbonate monohydrate ($Na_2CO_3.H_2O$) will be salted out in substantially pure form in effects E—2 and E—3. By further concentration in effect E—4 there is then crystallized an amount of the double salt, sodium potassium carbonate $$(NaKCO_3)$$

up to the point where pure potassium carbonate sesquihydrate ($K_2CO_3.1\frac{1}{2}H_2O$) may be recovered by cooling the mother liquor. The sodium carbonate from effects E—2 and E—3 is filtered and recovered for use, the effluent from E—4 is subjected to cooling to recover $K_2CO_3.3/2H_2O$, and the sodium potassium carbonate (from E—4) is returned to the evaporator feed tank with the most dilute evaporator feed. The mother liquor from the $K_2CO_3.3/2H_2O$ filter is preferably returned to evaporator E—4, but it may also be returned to feed tank 3 as indicated by the broken lines, Fig. 1. Further details may be had by reference to the Patents Nos. 2,343,080 and 2,343,081.

In the practice of the process described in my said patents it is desirable, as indicated above, to use as much crude sodium carbonate, as raw or calcined trona, as possible in relation to the $K_2O$ content of the wyomingite because this favors maximum $K_2O$ recovery and also because all of the $Na_2CO_3$ over that consumed in the base exchange reaction is recovered as the more valuable heavy soda ash in a state of high and commercially acceptable purity. However, the trona carries a small amount of common salt, NaCl, which is converted to KCl and crystallizes with the potassium carbonate when it is crystallized as the sesquicarbonate from the base exchange brine, and the greater the excess of crude soda ash used, the greater will be the chloride content of the potassium carbonate.

A primary object of the invention is to provide a simple, inexpensive, easily operable and efficient process for separating chloride from potassium carbonate and from brines containing it and sodium carbonate.

A particular object is to provide a process for producing potassium carbonate free from chloride by the method of my above-identified patents.

Other objects will appear hereinafter, among which is the production of pure potassium carbonate from the system comprising the reciprocal salt pairs $Na_2CO_3+KCL=K_2CO_3+NaCl$, and water.

Although the chloride content of potassium carbonate produced as just described may be acceptable for some purposes, the chloride-free product is of wider utility and commands a higher price. In my Patent No. 2,343,081, granted February 29, 1944, I have disclosed a process of separating the potassium chloride during the flow of the brine through the system. In accordance with that invention, and as appears more fully from the patent, the evaporation of the brine is conducted in multiple effect evaporators so arranged that the vapor pressure will increase substantially as the solutions become more concentrated with $K_2CO_3$. $Na_2CO_3.H_2O$ is salted out first in substantially pure form, and evaporation is carried out almost to the point where $NaKCO_3$ begins to crystallize. All or a part of the mother liquor may then be removed and partly cooled by adding it to the cold circulating mother liquor from the $$K_2CO_3.1\frac{1}{2}H_2O$$

crystals. This mixed liquor is then passed through a water cooled crystallizer to crystallize out the KCl, which occurs almost completely, thus removing substantially all of the chlorine introduced into the circuit by the trona or otherwise. The KCl is removed thereby so completely that little or none can crystallize out with the potassium carbonate sesquihydrate. The mother liquor from the KCl crystallization is then returned to the last evaporator effect where a quantity of the double salt, $NaKCO_3$, may be salted out down to the point (isothermal invariant point) where $K_2CO_3.1\frac{1}{2}H_2O$ comes out with it. At, or near, this point evaporation is stopped and the solution is cooled, say to about 25° C., to crystallize out the potassium carbonate sesquihydrate in substantially pure form. The mother liquor is returned to the circuit via the KCl crystallizer in the manner just described. For further details the Patent No. 2,343,081 may be consulted.

Although the process of separating chloride disclosed in my Patent No. 2,343,081 is satisfactorily and economically operative, I have now found that the same end may be accomplished more simply by recovering the potassium carbonate, as disclosed in my Patent No. 2,343,080, and as indicated in Fig. 1, and then treating it to separate its potassium chloride content.

In the practice of the present invention, accordingly, the starting material is the $$K_2CO_3.3/2H_2O$$

from crystallizer 4 which may be separated from excess mother liquor by means of a centrifuge 5. The preferred mode of practicing this invention is illustrated by Fig. 2 in which the amounts of material are on the basis of 100 tons of pearl ash, $K_2CO_3$.

Figure 2:
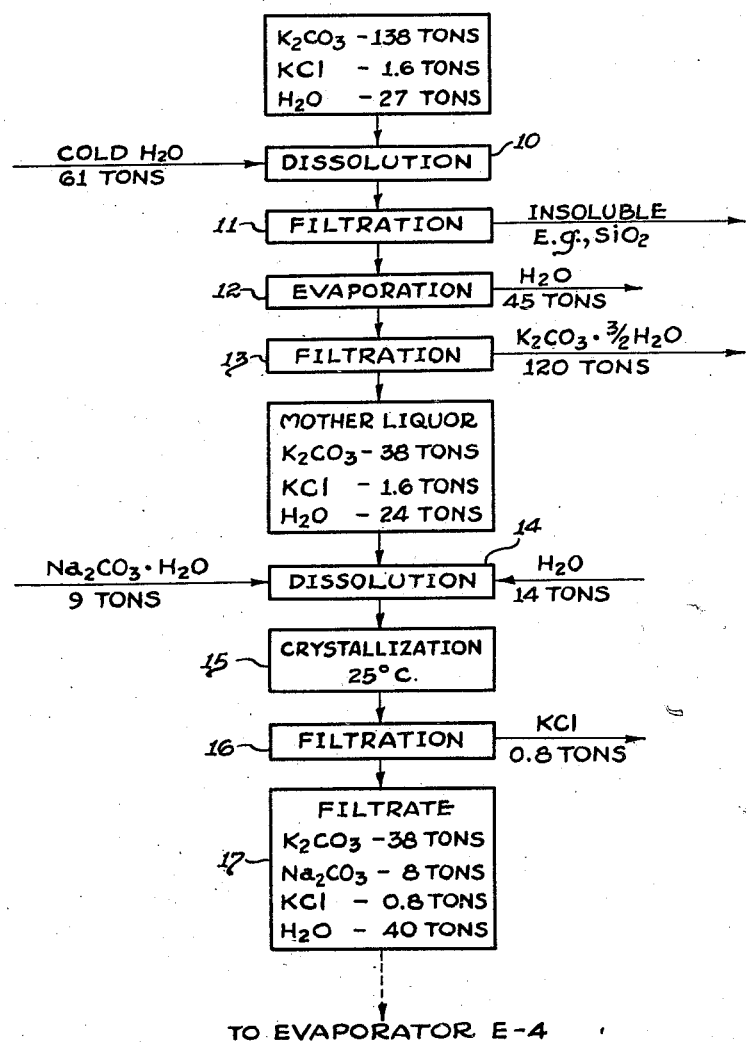

Having reference now to Fig. 2, 165 tons of the crude $K_2CO_3.3/2H_2O$ (138 tons $K_2CO_3$) from the centrifuge 5, Fig. 1, which may typically carry 1.6 tons of KCl is passed to a suitable container 10 to which there is added 61 tons of water to dissolve the crude carbonate. Solution may be expedited by the use of hot water, say about 100° C., but I prefer to use cold water to minimize the solution of any silica ($SiO_2$) that may fortuitously be present. The solution may then be treated in any suitable type of filter 11, to remove any $SiO_2$ and other water-insoluble matter. If silica is present it will usually be desirable to calcine the crude carbonate before passing it to dissolver 10, to reduce the solubility of the silica, in which event the amount of water added to the dissolver may be increased by an amount equal to that lost in calcination of the salt.

The solution is then passed to an evaporator 12 in which about 45 tons of water are evaporated, e. g., at 100° C. or higher, with concurrent crystallization of about 120 tons of $K_2CO_3.3/2H_2O$ (100 tons $K_2CO_3$), which is withdrawn and recovered from mother liquor by a filter 13. This carbonate is free from KCl and may be dried or calcined to prepare it for market.

The filtrate from filter 13 contains all of the KCl originally present in the crude carbonate together with about 38 tons of $K_2CO_3$ and 24 tons of water. To this in a suitable container 14 I add about 9 tons of $Na_2CO_3.H_2O$, suitably that recovered as shown in Fig. 1, and about 14 tons of water to form a solution of approximately the following composition:

| | Tons |
|---|---|
| $K_2CO_3$ | 38.0 |
| $Na_2CO_3$ | 8.0 |
| KCl | 1.6 |
| $H_2O$ | 40.0 |
| Total | 87.6 |

I have discovered, and the invention is in part predicated on this, that about half of the chloride may be recovered from such a solution by crystallization at about 25° C. Accordingly, the solution is passed to a crystallizer 15 from which about 0.8 ton of KCl is recovered, which in this case is the net amount added to the system.

The double salt, NaKCO₃, is also in equilibrium with a brine of this composition at 25° C. but I have found that it remains in supersaturation and thus allows the KCl to crystallize in pure form.

The KCl is recovered on a filter 16 and the mother liquor, of the approximate composition shown at 17, is treated or used in any suitable way, advantageously by cycling it to the double salt evaporator E—4, Fig. 1. In this way some chloride is kept circulating to the double salt evaporator but the $K_2CO_3.3/2H_2O$ recovered is free from chloride, and the net amount of KCl added is recovered as a saleable by-product.

Although the process has been described with particular reference to its combination with that of my Patent No. 2,343,080, it will be realized that it is applicable broadly to the separation of chloride from potassium carbonate, or from systems comprising mainly $K_2CO_3$, $NA_2CO_3$ and $H_2O$. Likewise, modification of details, such as the amounts of water and sodium carbonate added, or water evaporated, may be varied, depending upon practice preferences and the composition of the crude carbonate which is to be purified.

According to the provisions of the patent statutes, I have explained the principle and method of practicing my invention and have described what I now consider to represent its best embodiment. However, I desire to have it understood that, within the scope of the appended claims, the invention may be practiced otherwise than as specifically described.

I claim:

1. That method of separating potassium chloride from carbonate which comprises providing a solution of the crude carbonate, evaporating the solution to crystallize out potassium carbonate sesquihydrate, recovering said sesquihydrate, dissolving sodium carbonate in the resultant mother liquor in such an amount that on cooling potassium chloride crystallizes from the solution and the double salt NaKCO₃ formed remains in solution, and recovering the crystallized potassium chloride.

2. That method of separating potassium chloride from crude potassium carbonate containing it which comprises providing a solution of the crude carbonate, evaporating the solution to crystallize potassium carbonate sesquihydrate, recovering said sesquihydrate, dissolving sodium carbonate in the mother liquor in an amount such that potassium chloride crystallizes and sodium potassium carbonate will remain in solution when the brine is cooled, then cooling the mixed brine to crystallize potassium chloride, and recovering the chloride crystals.

3. That method of separating potassium chloride from crude potassium carbonate containing it which comprises evaporating a solution of the crude carbonate to crystallize out potassium carbonate sesquihydrate, recovering said sesquihydrate, dissolving sodium carbonate in the mother liquor to produce a mixed brine from which potassium chloride will crystallize and in which sodium potassium carbonate will remain in solution at 25° C., cooling said mixed brine to about 25° C. and thereby crystallizing out potassium chloride, and recovering the chloride crystals.

4. In a method of producing sodium and potassium carbonates from the system $$Na_2CO_3—K_2CO_3—H_2O$$

in which minor amounts of chlorides are present and in which the solution is evaporated in a starting circuit to crystallize out sodium carbonate monohydrate, then sodium potassium carbonate, and the mother liquor from the latter step is then cooled to crystallize out crude potassium carbonate sesquihydrate containing a minor amount of potassium chloride, the combination of steps which comprises forming a solution of said crude sesquihydrate and evaporating it to crystallize out pure potassium carbonate sesquihydrate, recovering the pure sesquihydrate crystals, dissolving sodium carbonate in the resultant mother liquor to form a mixed brine from which, on cooling, the potassium chloride will crystallize leaving the double salt NaKCO₃ in solution, cooling the said mixed brine and crystallizing pure potassium chloride from said mixed brine, recovering the chloride crystals, and circulating the latter mother liquor to the starting circuit.

5. A method according to claim 4 in which said chloride mother liquor is returned to the step of crystallizing said sodium potassium carbonate.

6. A method according to claim 4 in which said sodium carbonate is dissolved in said mother liquor in an amount such that sodium potassium carbonate remains in solution in the brine at about 25° C., and the potassium chloride is crystallized from the mixed brine at about 25° C.

7. A method according to claim 4 in which the potassium chloride mother liquor is circulated to the step of crystallizing sodium potassium carbonate in the starting circuit.

ROBERT D. PIKE.

REFERENCES CITED

The following references are of record in the file of this patent:

UNITED STATES PATENTS

| Number | Name | Date |
|--------|------|------|
| 1,770,995 | Pike et al. | July 22, 1930 |

OTHER REFERENCES

Chemical Engineering Handbook by Perry, 1941, 2d edition, pp. 1767-9.